(12) United States Patent
Shimokawa et al.

(10) Patent No.: US 10,160,312 B2
(45) Date of Patent: Dec. 25, 2018

(54) REFUELING PORTION STRUCTURE

(71) Applicants: TOYOTA JIDOSHA KABUSHIKI KAISHA, Toyota-shi, Aichi-ken (JP); TOYODA GOSEI CO., LTD., Kiyosu-shi, Aichi (JP)

(72) Inventors: Shinji Shimokawa, Seto (JP); Atsushi Sekihara, Koyosu (JP); Yoshinari Hiramatsu, Kiyosu (JP); Motoyasu Kito, Aichi-gun (JP); Akihito Hirunagi, Toyota (JP)

(73) Assignees: TOYOTA JIDOSHA KABUSHIKI KAISHA, Toyota (JP); TOYODA GOSEI CO., LTD., Kiyosu-shi (JP)

( * ) Notice: Subject to any disclaimer, the term of this patent is extended or adjusted under 35 U.S.C. 154(b) by 0 days.

(21) Appl. No.: 15/298,951

(22) Filed: Oct. 20, 2016

(65) Prior Publication Data
US 2017/0120746 A1 May 4, 2017

(30) Foreign Application Priority Data

Nov. 4, 2015 (JP) ................... 2015-216728

(51) Int. Cl.
*B60K 15/04* (2006.01)
(52) U.S. Cl.
CPC ........ *B60K 15/04* (2013.01); *B60K 2015/049* (2013.01)
(58) Field of Classification Search
CPC .................. B60K 15/04; B60K 2015/049
USPC ........................................ 141/350
See application file for complete search history.

(56) References Cited

U.S. PATENT DOCUMENTS

| 3,872,900 | A | * | 3/1975 | Gotz | ........... | B60K 15/04 141/392 |
| 4,040,458 | A | * | 8/1977 | Hansel | ........... | B67D 7/54 141/392 |
| 4,235,263 | A | * | 11/1980 | Lake, Jr. | ........... | B62J 35/00 141/1 |
| 6,079,581 | A | * | 6/2000 | Hashimoto | ........... | B60K 15/04 123/516 |
| 2010/0065153 | A1 | * | 3/2010 | Novak | ........... | B60K 15/04 141/198 |
| 2013/0306665 | A1 | * | 11/2013 | Eberhardt | ........... | B60K 15/04 220/746 |
| 2016/0075230 | A1 | * | 3/2016 | Goto | ........... | B60K 15/04 220/86.2 |
| 2017/0190248 | A1 | * | 7/2017 | Kikuya | ........... | B60K 15/04 |

FOREIGN PATENT DOCUMENTS

| CN | 103328250 A | | 9/2013 |
| JP | H11-115511 A | | 4/1999 |
| JP | H11-129769 A | | 5/1999 |
| JP | 2009-208517 A | | 9/2009 |
| JP | 2015-227111 A | | 12/2015 |
| JP | 201521418 A | * | 12/2015 |

* cited by examiner

*Primary Examiner* — Jason K Niesz
*Assistant Examiner* — James Hakomaki
(74) *Attorney, Agent, or Firm* — Oliff PLC

(57) ABSTRACT

A movement permitting section is provided at a nozzle guide 22 at an interior of an inlet pipe 14. When a stopper 24 receives pushing force toward a fuel tank side from a refueling nozzle 18, the movement permitting section deforms so as to permit movement of the stopper 24 toward a radial direction outer side of the nozzle guide 22 or toward a fuel tank side.

9 Claims, 9 Drawing Sheets

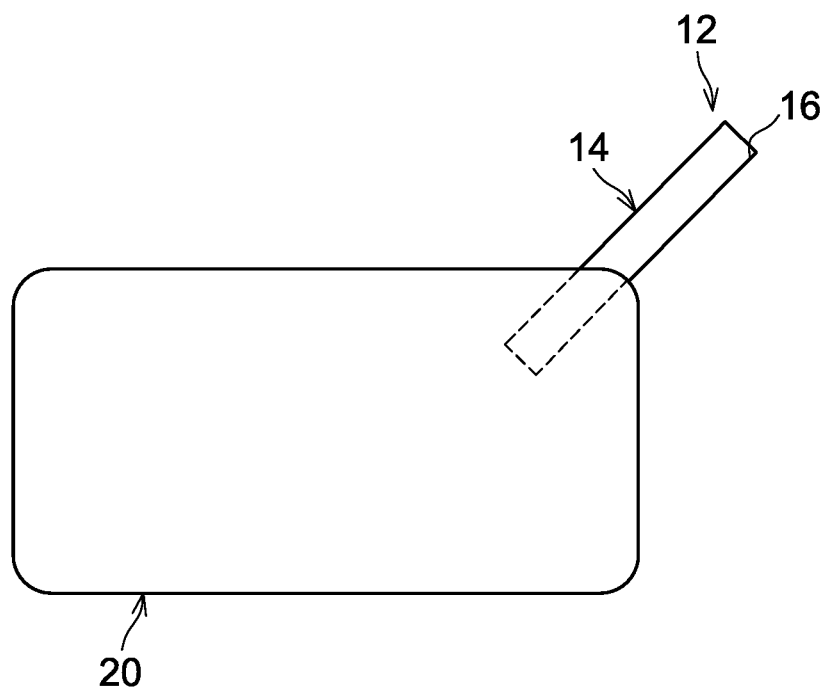

REFUELING PORTION STRUCTURE

CROSS-REFERENCE TO RELATED APPLICATION

This application is based upon and claims the benefit of priority of the prior Japanese Patent Application No. 2015-216728, filed on Nov. 4, 2015, the entire contents of which are incorporated herein by reference.

FIELD

The present invention relates to a refueling portion structure.

BACKGROUND

Japanese Laid-Open Patent Publication No. 2009-208517 discloses a refueling port structure in which a nozzle guide, that is tubular and that guides the insertion of a refueling nozzle of a fuel gun, is provided at the entrance portion of a filler tube that communicates with a fuel tank. In this refueling port structure, the refueling nozzle is abutted against and supported by the ridgelines of a pair of inward projections that are provided concavely at the nozzle guide, and by a portion of the inner peripheral surface between the inward projections.

In the structure of the above-described document, when the refueling nozzle hits the inward projections of the filler tube, further insertion of the refueling nozzle is impeded. Namely, the inward projections function as stoppers of the refueling nozzle.

It is desirable to suppress damage to the nozzle guide in consideration of cases in which the refueling nozzle hits the inward projections forcefully.

In view of the above-described circumstances, an object of the present invention is to provide a refueling portion structure that can effectively mitigate the shock at the time when a refueling nozzle hits a stopper of a nozzle guide.

SUMMARY

A first aspect has: an inlet pipe that has, at an upper portion thereof, an insertion port for a refueling nozzle, and whose lower portion is positioned within a fuel tank; a nozzle guide that is disposed at an interior of the inlet pipe, and that guides the refueling nozzle that has been inserted into the nozzle guide; a stopper that is provided at the nozzle guide, and that is abutted by a distal end of the refueling nozzle that has been inserted into the nozzle guide; and a movement permitting section that is provided at the nozzle guide, and that, when the stopper receives pushing force toward the fuel tank side from the refueling nozzle, deforms so as to permit movement of the stopper toward a radial direction outer side of the nozzle guide or toward the fuel tank side.

In this refueling portion structure, a refueling nozzle is inserted into the insertion port of the inlet pipe, and fuel can be supplied to the fuel tank. The refueling nozzle is guided by the nozzle guide that is disposed at the interior of the inlet pipe.

The stopper is provided at the nozzle guide. Insertion of the refueling nozzle is limited to a predetermined range due to the refueling nozzle, that has been inserted, hitting the stopper.

The movement permitting portion is provided at the nozzle guide. When the stopper receives pushing force toward the fuel tank side (the lower side) from the refueling nozzle, the movement permitting portion deforms so as to permit movement of the stopper toward the fuel tank side or the radial direction outer side. Because the stopper, that receives pushing force from the refueling nozzle, moves, the contact time over which the refueling nozzle and the stopper contact one another is long as compared with a structure in which the stopper does not move. Namely, because the time over which the momentum of the refueling nozzle is applied to the stopper is long, the load that the stopper receives from the refueling nozzle is small, and the shock at the time when the refueling nozzle hits the stopper can be mitigated effectively.

In a second aspect, in the first aspect, the movement permitting portion has an opposing portion that is provided at a region of the stopper at the nozzle guide, and that opposes an inner peripheral surface of the inlet pipe with a gap therebetween.

The opposing portion is provided at the nozzle guide, at the region of the stopper. A gap is provided between the opposing portion and the inner peripheral surface of the inlet pipe. The nozzle guide deforms toward the radial direction outer side so as to make this gap short.

By structuring a gap between the opposing portion of the nozzle guide and the inner peripheral surface of the inlet pipe in this way, the stopper can be moved reliably toward the radial direction outer side when the refueling nozzle hits the stopper.

In a third aspect, the second aspect further includes an inclined surface that is provided at the stopper, and that converts the pushing force into force that moves the stopper toward a radial direction outer side.

Accordingly, when the refueling nozzle pushes the stopper, the pushing force is converted, by the inclined surface, into force that moves (widens) the stopper toward the radial direction outer side of the nozzle guide. Namely, the pushing force of the refueling nozzle can be utilized effectively in order to move the stopper toward the radial direction outer side of the nozzle guide.

In a fourth aspect, the second or third aspect further includes a rib that projects-out toward a radial direction outer side from an outer periphery of the nozzle guide, wherein the gap is larger than a gap between the inlet pipe and the rib.

The nozzle guide is reinforced by the rib. Because the rib projects-out from the outer periphery of the nozzle guide toward the radial direction outer side, the rib does not affect insertion of the refueling nozzle into the nozzle guide.

The gap between the inlet pipe and the opposing portion of the nozzle guide is larger than the gap between the inlet pipe and the rib. Accordingly, even in a state in which the rib contacts the inlet pipe, the gap between the opposing portion of the nozzle guide and the inner peripheral surface of the inlet pipe is ensured, and the stopper can be moved toward the radial direction outer side.

In a fifth aspect, in the fourth aspect, the rib is formed at a position that avoids the opposing portion.

Accordingly, the rib does not exist at the position of the opposing portion that is the region where the stopper is provided. Namely, when the opposing portion moves toward the radial direction outer side of the nozzle guide, that movement is not impeded by the rigidity of the rib, and the opposing portion can be reliably moved toward the radial direction outer side of the nozzle guide.

In a sixth aspect, in the first aspect, the movement permitting portion is a flexible portion that is provided at the nozzle guide at further toward an upper side than the stopper, and that permits extension of a portion of the nozzle guide due to the pushing force.

Accordingly, when the refueling nozzle pushes the stopper, due to the pushing force, a portion of the nozzle guide extends at the flexible portion, and the stopper moves toward the fuel tank side.

In this way, due to the simple structure of providing the flexible portion at the nozzle guide, the stopper can be moved toward the fuel tank side at the time when the refueling nozzle hits the stopper.

BRIEF DESCRIPTION OF DRAWINGS

FIG. 9 is a drawing showing the relationship between a fuel tank and the inlet pipe.

DESCRIPTION OF EMBODIMENTS

Figure 1:
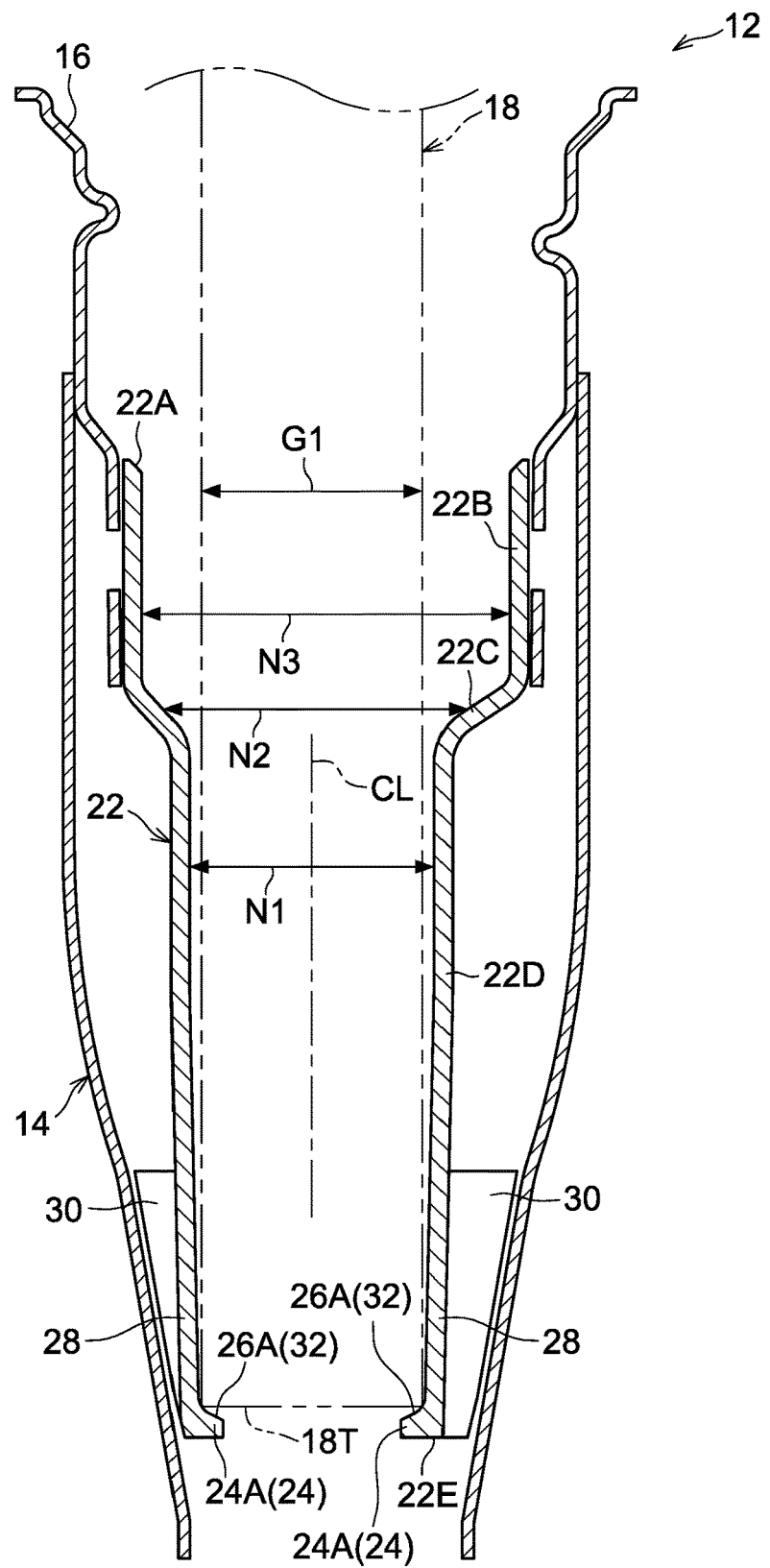
FIG. 1 is a cross-sectional view that shows a refueling portion structure of a first embodiment.

A refueling portion structure 12 of a first embodiment is shown in FIG. 1 through FIG. 6. As is shown in FIG. 9 as well, this refueling portion structure 12 has an inlet pipe 14. The inlet pipe 14 is formed in a tubular shape. The opening at the upper portion of the inlet pipe 14 is an insertion port 16. A refueling nozzle 18 is inserted into the insertion port 16.

As shown in FIG. 9, the lower portion of the inlet pipe 14 is positioned at the interior of a fuel tank 20. Fuel can be supplied from the refueling nozzle 18, that has been inserted into the insertion port 16, through the inlet pipe 14 into the fuel tank 20.

Figure 2:
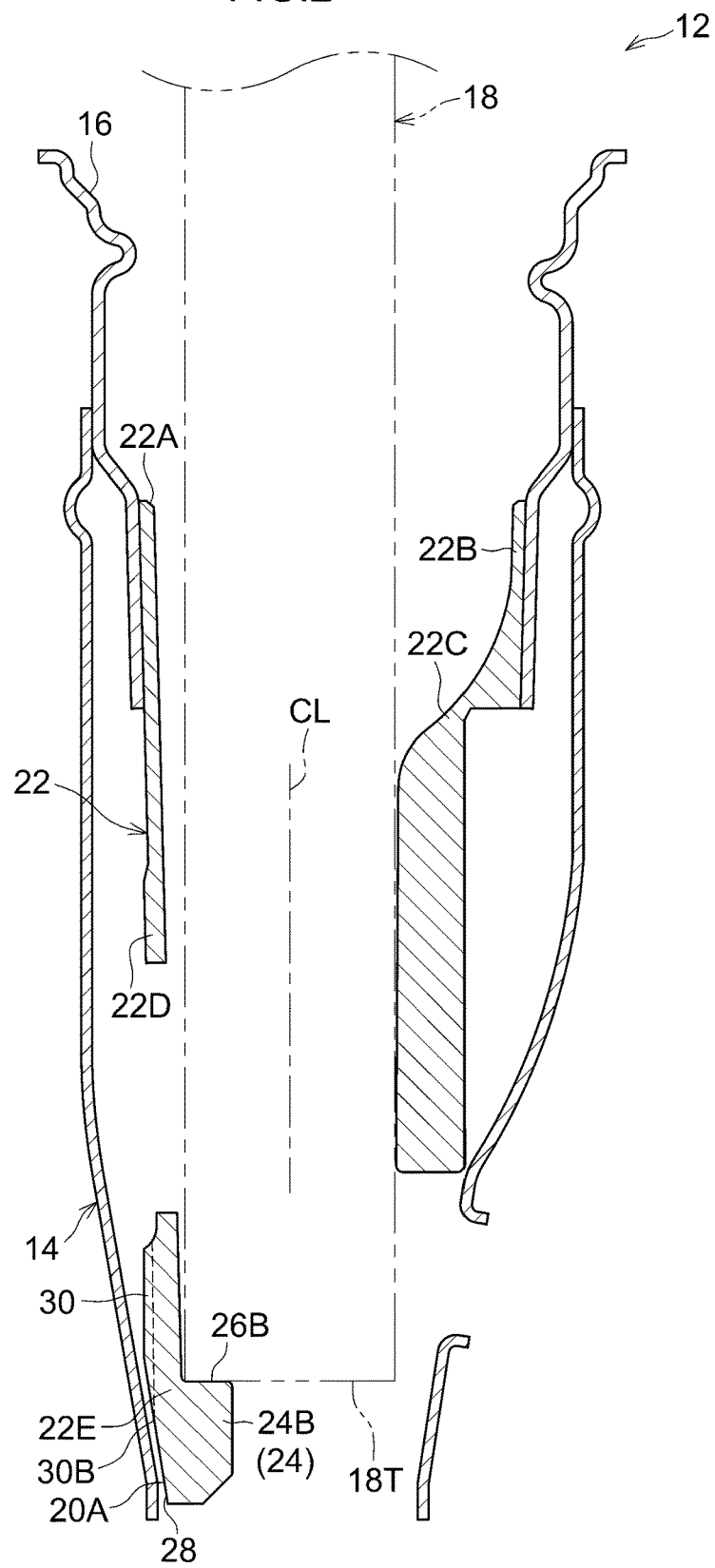
FIG. 2 is a cross-sectional view that shows the refueling portion structure of the first embodiment at a cross-sectional position that is different than that of FIG. 1.

As shown in FIG. 1 and FIG. 2, a nozzle guide 22 is disposed at the interior of the inlet pipe 14. The nozzle guide 22 is a member that is substantially cylindrically tube shaped on the whole. The refueling nozzle 18 is inserted into the interior from an upper end portion 22A of the nozzle guide 22.

The nozzle guide 22 has a large diameter portion 22B at the upper end side, a small diameter portion 22D at the lower end side, and an inclined portion 22C between the large diameter portion 22B and the small diameter portion 22D. The nozzle guide 22 is mounted to the inlet pipe 14 at the upper portion (the large diameter portion 22B) of the nozzle guide 22.

The small diameter portion 22D of the nozzle guide 22 has an internal diameter N1 that is slightly larger than outer diameter G1 of the refueling nozzle 18. The large diameter portion 22B has an internal diameter N3 that is larger than that of the small diameter portion 22D. Further, the inclined portion 22C has an internal diameter N2 that continuously changes from the large diameter portion 22B toward the small diameter portion 22D. The refueling nozzle 18 moves from the inner side of the large diameter portion 22B toward the fuel tank 14 side (the lower side). When the refueling nozzle 18 hits the inclined portion 22C in the midst of movement, the refueling nozzle 18 is guided to the center of the small diameter portion 22D (shown by central line CL) by this inclined portion 22C.

Stoppers 24 that face toward the radial direction inner side are formed at a lower end portion 22E of the nozzle guide 22 (the small diameter portion 22D). In the first embodiment, the stopper 24 includes a pair of first stoppers 24A, and a single second stopper 24B that is positioned between these first stoppers 24A. When explanation is given while not differentiating between the first stoppers 24A and the second stopper 24B, they are referred to as the stoppers 24.

Figure 3:
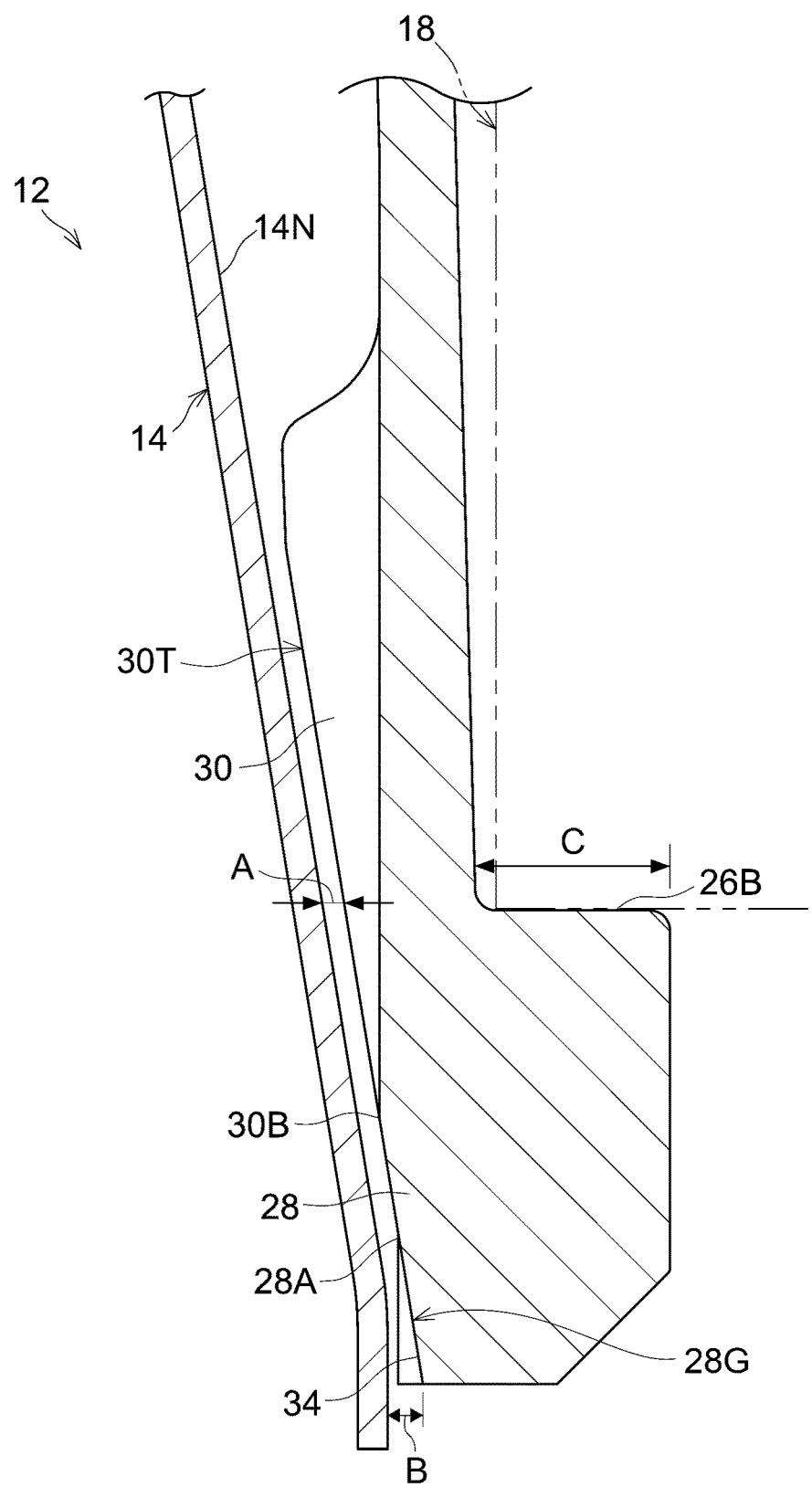
FIG. 3 is a cross-sectional view that shows a portion of the refueling portion structure of the first embodiment in an enlarged manner.
Figure 4:
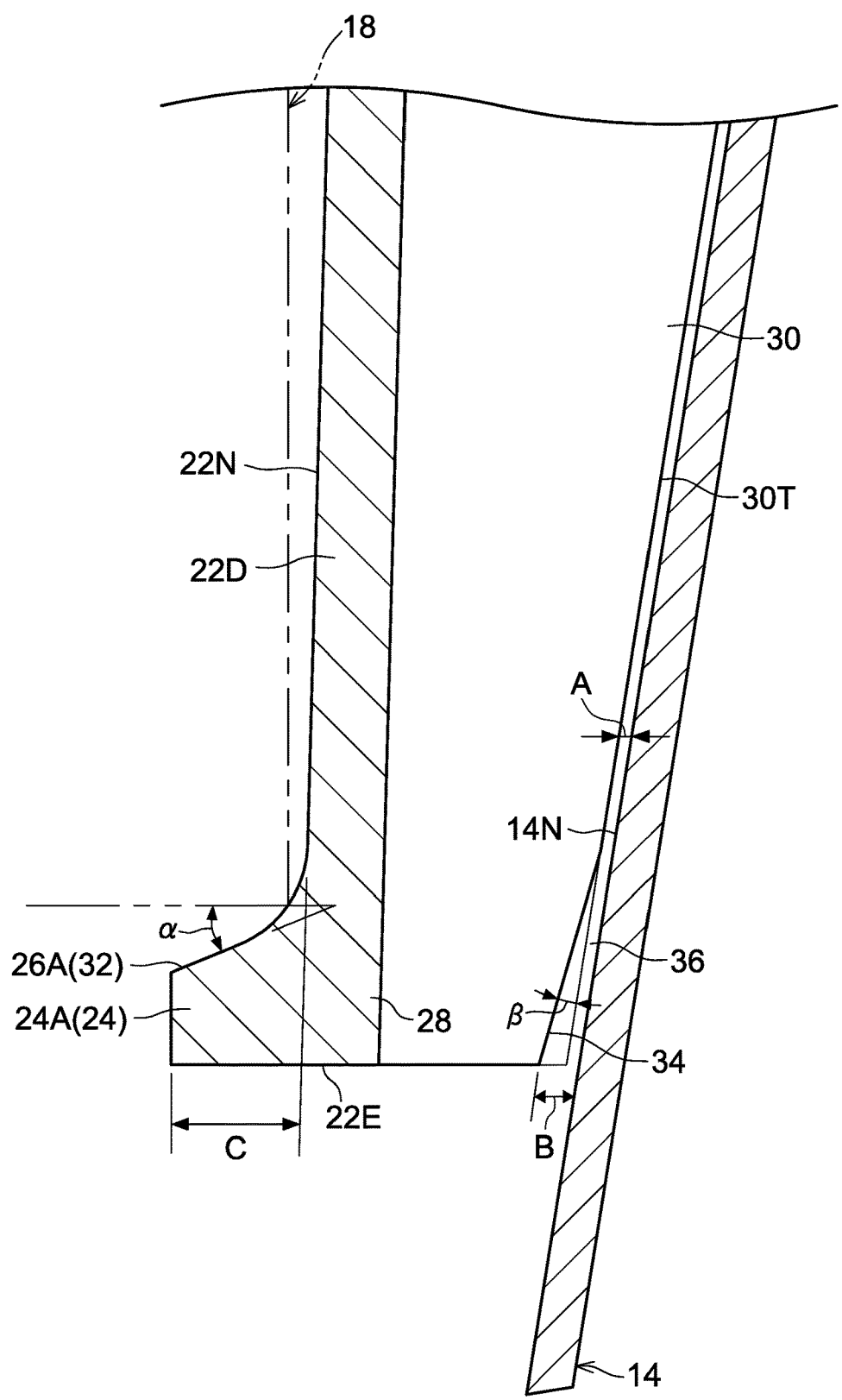
FIG. 4 is a cross-sectional view that shows a portion of a refueling portion structure of a second embodiment in an enlarged manner.

The upper side surfaces of the first stoppers 24A and the second stopper 24B are contact surfaces 26A, 26B. A distal end portion 18T of the inserted refueling nozzle 18 contacts the contact surfaces 26A, 26B. Due to the distal end portion 18T of the refueling nozzle 18 contacting the stoppers 24 in this way, insertion of the refueling nozzle 18 is limited to a predetermined range. As shown in FIG. 3 and FIG. 4, at the stoppers 24, the length by which the stopper 24 protrudes-out toward the radial direction inner side from an inner peripheral surface 22N of the small diameter portion 22D is projection length C.

At the small diameter portion 22D, the vicinity of the portion where the stoppers 24 are formed (the portion at the lower end portion 22E side) is an opposing portion 28. As shown in FIG. 3, an outer peripheral surface 28G of the opposing portion 28 opposes an inner peripheral surface 14N of the inlet pipe 14 with a first gap B therebetween. This opposing portion 28 is a region that deforms toward the radial direction outer side when the opposing portion 28 receives force toward the radial direction outer side from the radial direction inner side of the nozzle guide 22.

Plural ribs 30, that project-out toward the radial direction outer side of the nozzle guide 22 and extend in the length direction, are formed at the outer periphery of the small diameter portion 22D. The nozzle guide 22 (the small diameter portion 22D) is reinforced by the ribs 30.

As shown in FIG. 3, a projecting end 30T of the rib 30 faces the inner peripheral surface 14N of the inlet pipe 14 with a second gap A therebetween. This second gap A is smaller than the first gap B between the outer peripheral surface 28G of the opposing portion 28 and the inner peripheral surface 14N of the inlet pipe 14. Namely, there is the relationship a<b.

Further, with regard to the relationship with projecting length C of the above-described stopper 24, the projecting length C is larger than the first gap B. Namely, b<c.

The contact surface 26B of the second stopper 24B is perpendicular with respect to the central line CL of the small diameter portion 22D. In contrast, the contact surfaces 26A of the first stoppers 24A are inclined surfaces 32 that are inclined with respect to the central line CL of the small diameter portion 22D. The inclined surfaces 32 are inclined at inclination angle α toward the lower end portion 22E side, while heading from the radial direction outer side toward the radial direction inner side. When the inclined surfaces 32 are pushed by the distal end of the refueling nozzle 18, pushing force F1 thereof is converted into force (moving force F2) that moves the opposing portion 28 toward the radial direction outer side. Note that, when the inclined surfaces 32 are pushed in this way, the refueling nozzle 18 moves slightly toward the fuel tank 20 side. The contact surface 26B (the second stopper 24B) is at a position and is a structure that do not impede this movement of the refueling nozzle 18.

The first gap B is structured between the outer peripheral surface 28G of the opposing portion 28 and the inner peripheral surface 14N of the inlet pipe 14. Therefore, when the moving force F2 is applied to the opposing portion 28, the opposing portion 28 flexurally deforms toward the radial direction outer side such that this first gap B becomes smaller. When the opposing portion 28 deforms in this way, the stoppers 24 also move toward the radial direction outer side. Due thereto, the time over which the refueling nozzle 18 contacts the stoppers 24 (contact time Δt) is long as compared with a structure in which stoppers do not move.

As shown in FIG. 3 and FIG. 4, a reduced diameter portion 34, whose outer diameter becomes smaller toward the lower end portion 22E side, is formed at the outer periphery of the opposing portion 28. At the opposing portion 28, given that the inclination angle of the portion (a general portion 36) at which the reduced diameter portion 24 is not formed is β, the shapes of the inclined surfaces 32 and the reduced diameter portion 34 are determined, by using the inclination angle α of the inclined surfaces 32, such that α+β<90°.

As shown in FIG. 3, a lower end 30B of the rib 30 is further upward than an upper end 28A of the opposing portion 28. In other words, the ribs 30 are formed at positions that avoid the opposing portion 28. Namely, there is a structure in which deformation of the opposing portion 28 is not impeded by the ribs 30.

Operation of the present embodiment is described next.

The refueling nozzle 18, that has been inserted from the insertion port 16 into the inlet pipe 14, is guided by the nozzle guide 22. Further, as shown in FIG. 3 and FIG. 4, the distal end portion 18T of the refueling nozzle 18 hits the contact surfaces 26A, 26B of the stoppers 24. Due thereto, insertion of the refueling nozzle 18 is limited, and excessive insertion of the refueling nozzle 18 is suppressed.

A case in which the distal end of the refueling nozzle 18 hits the contact surfaces 26A, 26B strongly is considered here. In the present embodiment, the contact surfaces 26A of the first stoppers 24A are the inclined surfaces 32 that are inclined with respect to the central line CL of the small diameter portion 22D. Further, when the inclined surfaces 32 are pushed by the distal end of the refueling nozzle 18, the pushing force F1 thereof is converted into force (the moving force F2) that moves the opposing portion 28 toward the radial direction outer side. By effectively utilizing the pushing force of the refueling nozzle 18, the stoppers 24 can be moved toward the radial direction outer side of the nozzle guide 22.

Figure 5:
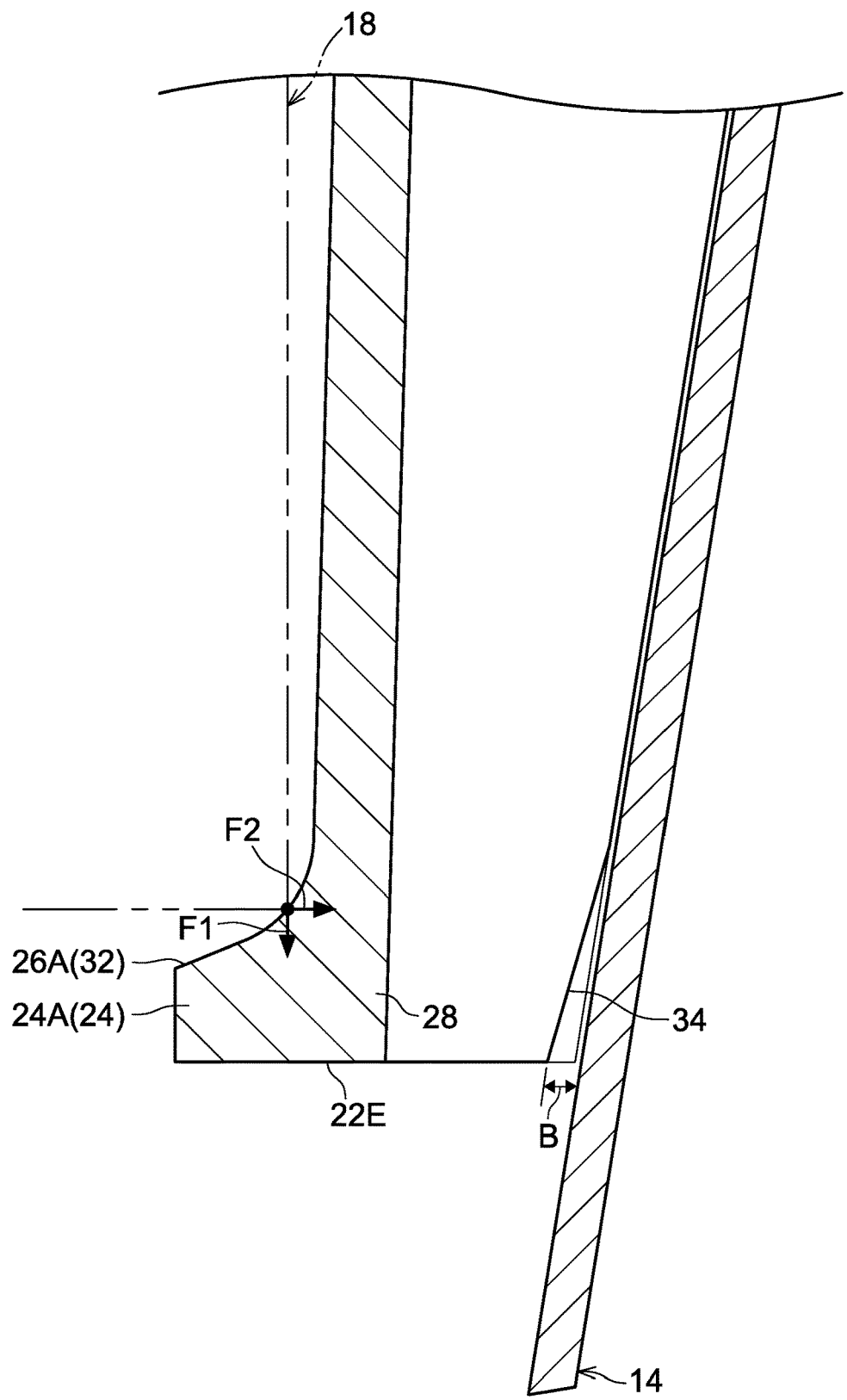
FIG. 5 is a cross-sectional view showing a state in which a refueling nozzle is inserted in an inlet pipe, in the refueling portion structure of the first embodiment.

Further, as shown in FIG. 5, the opposing portion 28 deforms toward the radial direction outer side while the first gap B between the opposing portion 28 and the inner peripheral surface 14N of the inlet pipe 14 is made shorter. Due to this deformation of the opposing portion 28, the stoppers 24 also move toward the radial direction outer side. Due thereto, the time over which the refueling nozzle 18 contacts the stoppers 24 (the contact time Δt) is long as compared with a structure in which the stoppers 24 do not move toward the radial direction outer side.

If the time over which the momentum of the refueling nozzle 18 is applied to the stoppers 24 is long, the force (shock) that the stoppers 24 receive from the refueling nozzle 18 is smaller than in a structure in which the opposing portion 28 does not deform. Namely, in the present embodiment, the shock at the time when the refueling nozzle 18 hits the stoppers 24 can be mitigated effectively.

In the present embodiment in particular, the first gap B is structured between the opposing portion 28 and the inner peripheral surface 14N of the inlet pipe 14. When the refueling nozzle 18 hits the stoppers 24, the stoppers 24 can be reliably moved toward the radial direction outer side by effectively utilizing this first gap B.

In the present embodiment, the first gap B is larger than the second gap A between the projecting end 30T of the rib 30 and the inner peripheral surface 14N of the inlet pipe 14. Accordingly, the opposing portion 28 can be deformed toward the radial direction outer side also after the projecting ends 30T of the ribs 30 hit the inner peripheral surface 14N of the inlet pipe 14.

Figure 6:
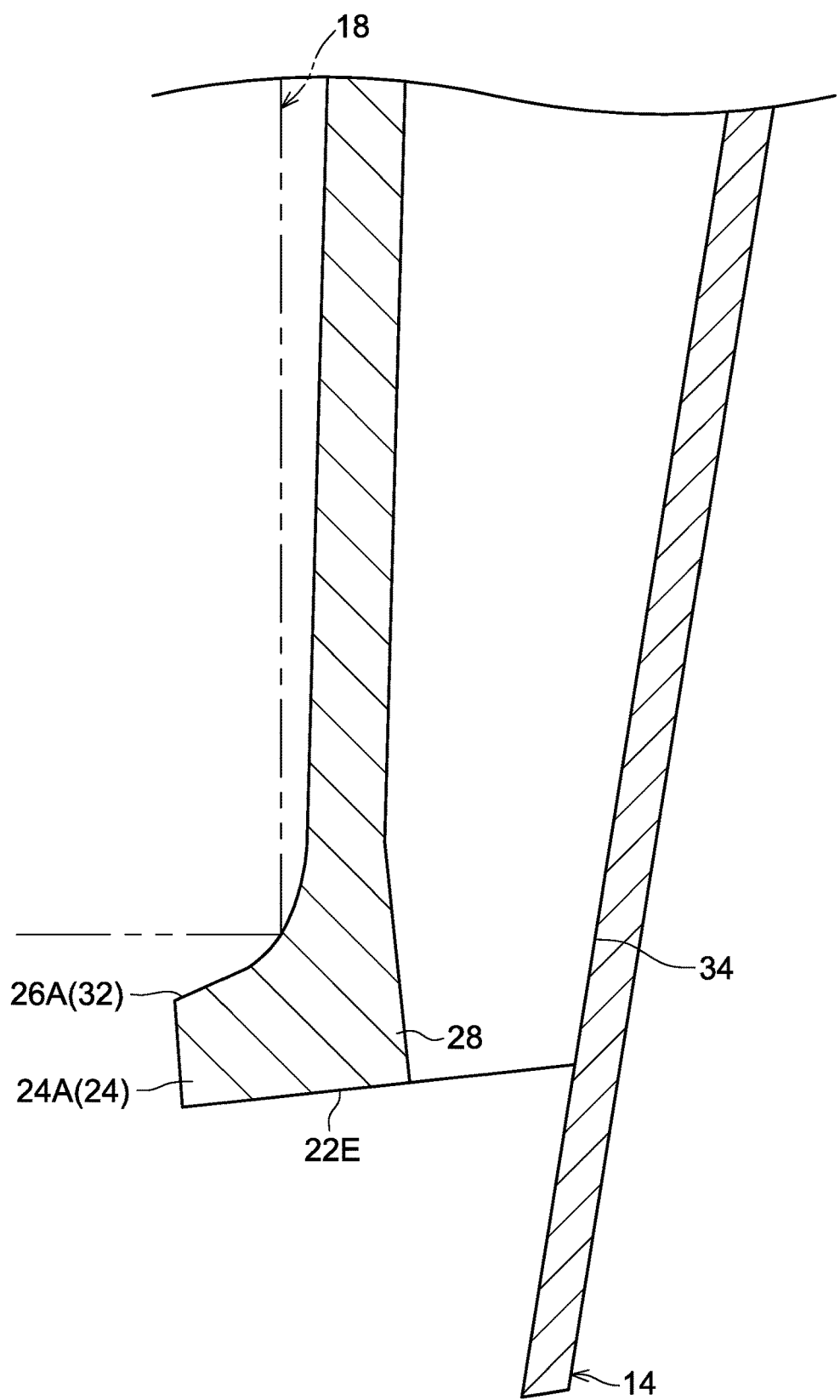
FIG. 6 is a cross-sectional view showing the state in which the refueling nozzle is inserted in the inlet pipe, in the refueling portion structure of the first embodiment.

It is assumed that, when the stoppers 24 move toward the radial direction outer side, as shown in FIG. 6, in particular the portion where the reduced diameter portion 34 is formed at the opposing portion 28 also deforms so as to bend toward the radial direction outer side. In the present embodiment, the projecting length C of the stoppers 24 is larger than the above-described first gap B. The state in which the stoppers 24 project-out toward the radial direction inner side and contact the distal end portion 18T of the refueling nozzle 18 can be maintained, even in a state in which the reduced diameter portion 34 deforms to the maximum limit (widens) until the first gap B becomes zero as shown in FIG. 6, i.e., until the reduced diameter portion 34 contacts the inner peripheral surface of the inlet pipe 14, and contacts the inner peripheral surface 14N of the inlet pipe 14. Namely, even if the reduced diameter portion 34 widens toward the radial direction outer side, excessive insertion of the refueling nozzle 18 can be suppressed.

Moreover, in the present embodiment, there is no need to make the nozzle guide 22, and the stoppers 24 in particular, large and to increase the rigidity thereof in order to suppress damage at the time when the refueling nozzle 18 hits the stoppers 24. By keeping the nozzle guide 22 from becoming large, a structure that does not affect refueling, or in which the effects on refueling are small, can be realized.

A second embodiment is described next. In the second embodiment, elements, members and the like that are similar to those of the first embodiment are denoted by the same reference numerals, and detailed description thereof is omitted.

Figure 7:
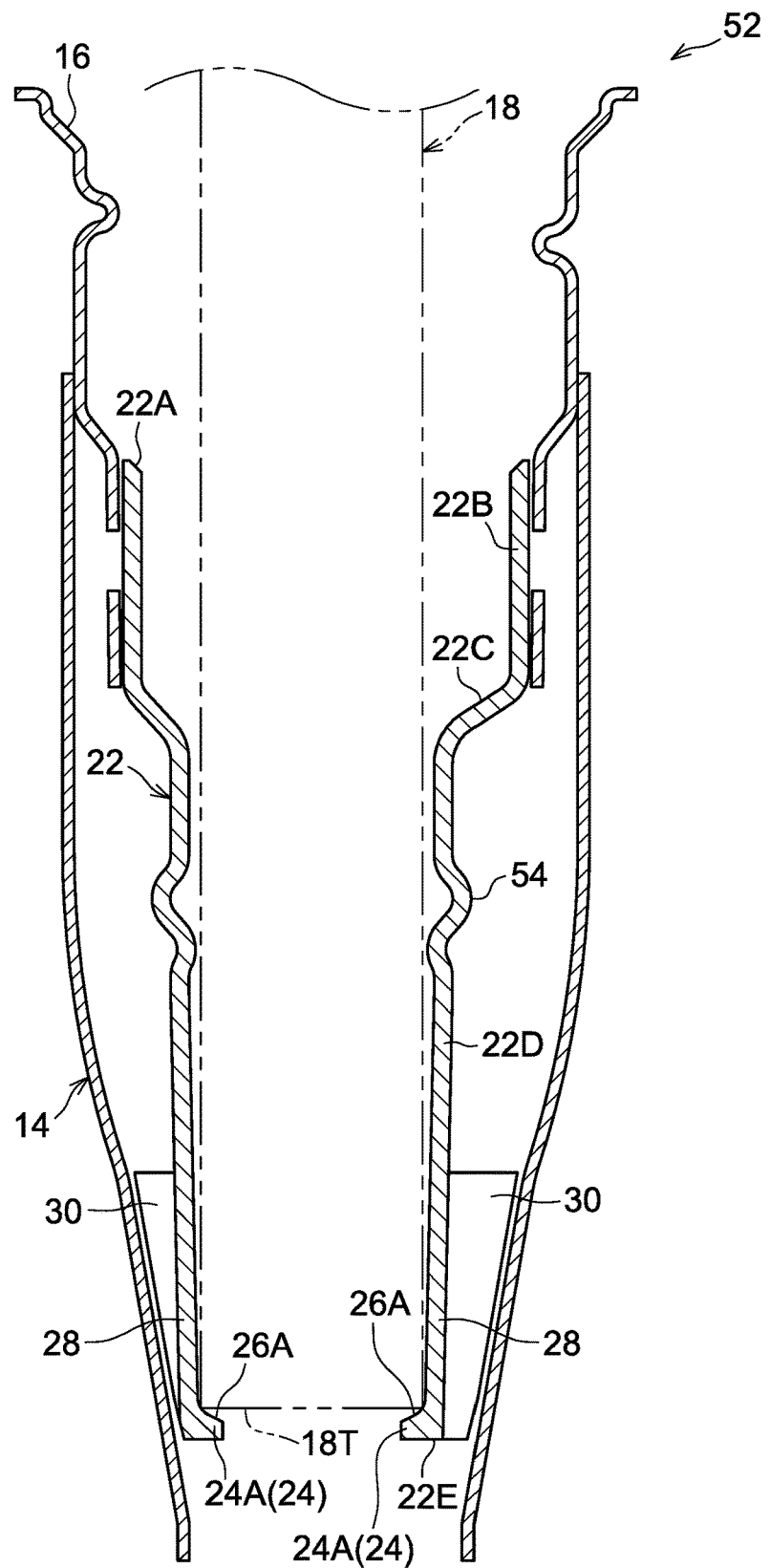
FIG. 7 is a cross-sectional view showing the refueling portion structure of the second embodiment.

As shown in FIG. 7, in a refueling portion structure 52 of the second embodiment, a bellows portion 54 is formed at the nozzle guide 22. The portion of the nozzle guide 22 at the bellows portion 54 is flexible. The bellows portion 54 is a region that permits extension of a portion of the nozzle guide 22. In particular, when tensile force is applied from the upper and lower both sides of the bellows portion 54 (the length direction both sides of the nozzle guide 22), the nozzle guide 22 is extended at the region of the bellows portion 54.

Figure 8:
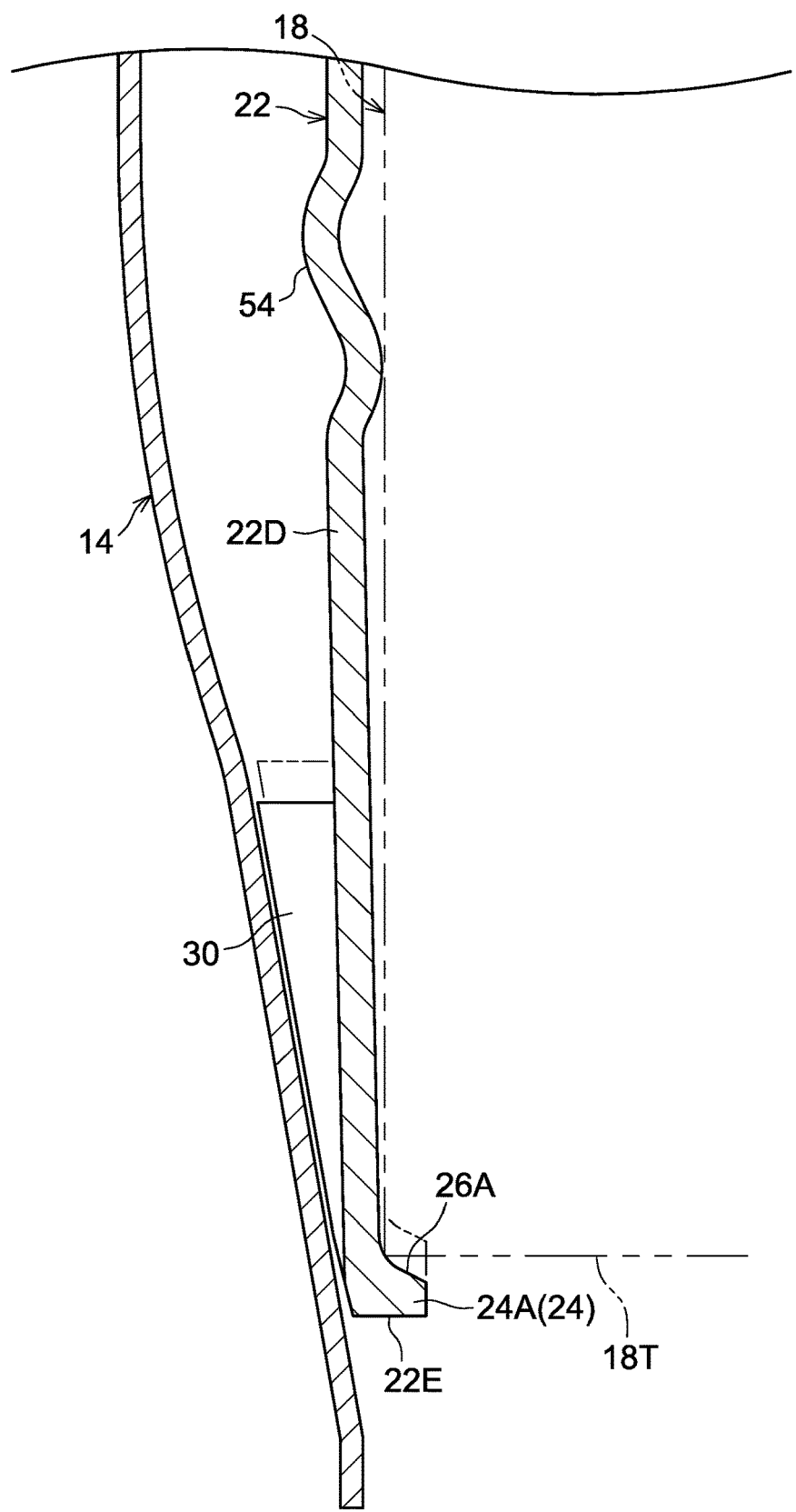
FIG. 8 is a cross-sectional view showing a state in which the refueling nozzle is inserted in the inlet pipe, in the refueling portion structure of the second embodiment.

In the refueling portion structure 52 of the second embodiment that has such a structure, when the refueling nozzle 18 forcefully hits the stoppers 24, as shown in FIG. 8, the portion of the nozzle guide 22, which portion is further toward the lower end portion 22E side than the bellows portion 54, moves toward the lower side. The entire nozzle guide 22 extends in the length direction.

Further, due to the stoppers 24 also moving toward the lower side due thereto, the time over which the refueling nozzle 18 contacts the stoppers 24 (the contact time Δt) is long as compared with a structure in which the stoppers 24 do not move. The time over which the momentum of the refueling nozzle 18 is applied to the stoppers 24 also is long. The force (shock) that the stoppers 24 receive from the refueling nozzle 18 is smaller than in a structure in which the bellows portion 54 does not deform. Similarly to the first embodiment, in the second embodiment as well, the shock at the time when the refueling nozzle 18 hits the stoppers 24 can be mitigated effectively.

In the second embodiment, a structure that mitigates shock at the time when the refueling nozzle 18 hits the stoppers 24 can be realized by the simple structure of forming the bellows portion 54 at the nozzle guide 22.

In the second embodiment, the position where the flexible portion (the bellows portion 54) is formed is not limited. In the example shown in FIG. 7 and FIG. 8, the bellows portion 54 is formed at the small diameter portion 22D, but, for example, may be formed at the inclined portion 22C. However, it suffices to form the bellows portion 54 at a position, such as the inclined portion 22C or the like, that is nearer to the stoppers 24 (the fuel tank 14 side) than the portion where the nozzle guide 22 is fixed to the inlet pipe 14 (the large diameter portion 22B in the example of FIG. 7).

The bellows portion 54 is an example of the flexible portion. It suffices for the flexible portion to be provided further toward the upper end side than the stoppers 24, and to be able to extend the nozzle guide 22 in the length direction by the downwardly-directed force that the stoppers 24 receive (the pushing force from the refueling nozzle 18). For example, the nozzle guide 22 may be formed such that a portion thereof is thin-walled, and there may be a structure in which this thin-walled portion extends.

Further, the inclined portion 22C may be a structure that substantially functions as the flexible portion. In a structure in which the inclined portion 22C is made to be the flexible portion, by deforming the inclined portion 22C such that the inclination angle of the inclined portion 22C becomes smaller (the inclined portion 22C becomes closer to parallel to the small diameter portion 22D), a structure in which the stoppers 24 move toward the lower end side (the fuel tank 14 side) can be realized.

Moreover, there may be a structure in which the nozzle guide 22 is divided upward and downward, and the lower-side nozzle guide is slidably connected to the upper-side nozzle guide. In this case, the portion that slidably connects the upper and lower nozzle guides is the movement permitting portion.

The structure of the first embodiment and the structure of the second embodiment can be combined. For example, in the refueling portion structure 12 of the first embodiment, the bellows portion 54 relating to the second embodiment may be provided at the nozzle guide 22. In this structure, movement in the direction combining the radial direction outer side and the fuel tank side (the lower side) of the nozzle guide can be engendered at the stoppers 24.

In the present application, shock at the time when a refueling nozzle hits a stopper of a nozzle guide can be mitigated effectively.

The disclosure of Japanese Patent Application No. 2015-216728 filed on Nov. 4, 2015 is, in its entirety, incorporated by reference into the present specification.

All cited documents, patent applications and technical standards mentioned in the present specification are incorporated by reference in the present specification to the same extent as if the individual cited documents, patent applications and technical standards were specifically and individually incorporated by reference in the present specification.

What is claimed is:

1. A refueling portion structure comprising:
    an inlet pipe that has, at an upper portion thereof, an insertion port for a refueling nozzle, and whose lower portion is positioned within a fuel tank;
    a nozzle guide that is disposed at an interior of the inlet pipe, and that guides the refueling nozzle that has been inserted into the nozzle guide;
    a stopper that is provided at the nozzle guide, and that is abutted by a distal end of the refueling nozzle that has been inserted into the nozzle guide;
    a movement permitting section that is provided at the nozzle guide, and that, when the stopper receives a pushing force toward a fuel tank side from the refueling nozzle, deforms so as to permit movement of the stopper toward a radial direction outer side of the nozzle guide or toward the fuel tank side; and
    a plurality of ribs that are provided at the nozzle guide, project out toward the radial direction outer side of the nozzle guide, and extend in a longitudinal direction of the nozzle guide,
    wherein the plurality of the ribs include a rib that extends to a lower end portion of the nozzle guide, a second gap between the rib and the inlet pipe at the lower end portion of the nozzle guide being larger than a first gap between the rib and the inlet pipe at a remainder portion other than the lower end portion of the nozzle guide.

2. The refueling portion structure of claim 1, wherein the movement permitting portion has an opposing portion that is provided at a region of the nozzle guide at which region the stopper is provided, and that opposes an inner peripheral surface of the inlet pipe with the first gap therebetween.

3. The refueling portion structure of claim 2, further comprising an inclined surface that is provided at the stopper, and that converts the pushing force into force that moves the stopper toward a radial direction outer side.

4. The refueling portion structure of claim 3, wherein the inclined surface is inclined toward the fuel tank side while heading from a radial direction outer side toward an inner side of the nozzle guide.

5. The refueling portion structure of claim 1, wherein the rib is formed at a position that avoids the opposing portion.

6. The refueling portion structure of claim 1, wherein the nozzle guide has:
    at the fuel tank side of the nozzle guide, a small diameter portion whose internal diameter is larger than an external diameter of the refueling nozzle;
    at an insertion port side of the nozzle guide, a large diameter portion whose internal diameter is larger than the internal diameter of the small diameter portion; and
    an inclined portion whose internal diameter continuously changes from the small diameter portion toward the large diameter portion.

7. The refueling portion structure of claim 6, wherein the stopper and the movement permitting portion are provided at the small diameter portion.

8. The refueling portion structure of claim 1, wherein the movement permitting portion is a flexible portion that is provided at the nozzle guide at further toward an upper side than the stopper, and that permits extension of a portion of the nozzle guide due to the pushing force.

9. The refueling portion structure of claim 8, wherein the flexible portion is a bellows portion at which the nozzle guide is bent in a shape of bellows.

\* \* \* \* \*